United States Patent [19]
Cziska et al.

[11] 3,943,061
[45] Mar. 9, 1976

[54] USE OF AN IRON/SILICON/PHOSPHORUS-ALLOY IN SEPARATION OF MINERALS

[75] Inventors: Johann Cziska, Erftstadt Lechenich; George Strauss, Hurth-Hermulheim; Wilhelm Portz, Erftstadt Kierdorf; Klaus Komorniczyk, Turnich-Balkhausen; Joachim Kandler, Erftstadt Lechenich, all of Germany

[73] Assignee: Hoechst Aktiengesellschaft, Knapsack near Cologne, Germany

[22] Filed: May 4, 1973

[21] Appl. No.: 357,332

[30] Foreign Application Priority Data

May 9, 1972 Germany ............................ 2222657

[52] U.S. Cl. ................................ 252/60; 209/172.5
[51] Int. Cl.$^2$.... B29F 1/00; C09K 3/00; B03B 5/30; B03D 1/00

[58] Field of Search .................... 252/60; 209/172.5; 111/75.5 BA, 75.5 C

[56] References Cited

UNITED STATES PATENTS

| | | | |
|---|---|---|---|
| 3,454,498 | 7/1969 | Gabler et al. | 252/60 |

FOREIGN PATENTS OR APPLICATIONS

| | | | |
|---|---|---|---|
| 1,212,733 | 3/1966 | Germany | 252/60 |
| 972,687 | 9/1959 | Germany | 252/60 |

*Primary Examiner*—Leland A. Sebastian
*Assistant Examiner*—Josephine Lloyd
*Attorney, Agent, or Firm*—Connolly and Hutz

[57] ABSTRACT

The invention provides the use of an iron/silicon/phosphorus-alloy containing between 8 and 25 weight % of silicon and between 0.3 and 2.5 weight % of phosphorus as heavy medium for making heavy pulps for the heavy media separation of minerals.

6 Claims, No Drawings

USE OF AN IRON/SILICON/PHOSPHORUS-ALLOY IN SEPARATION OF MINERALS

The production of various ferrosilicon alloys containing substantially 15 weight % of silicon and their uses as heavy media in aqueous heavy pulps for the heavy media separation of minerals, for example ores, have already been described in German Pat. Nos. 972,687 and 1,212,733 and in German published specification DAS No. 1,058,081. These known ferrosilicon alloys contain at best traces of phosphorus, up to substantially 0.05 weight %. Ground ferrosilicon powders are, however, highly susceptible to corrosion and abrasion in the heavy pulps. For this reason, use should conveniently be made of atomized ferrosilicon powders, of which the individual particles have a smooth and spheroidal, preferably a spherical, surface.

Heavy medium separation is a process used for achieving the separation of minerals with different densities by means of an aqueous suspension of a finely divided heavy medium, termed heavy pulp, which has a density lying between the densities of the minerals to be separated from each other. Upon the introduction of the mixture of minerals into the suspension, the relatively light weight constituents of the mixture are found to float on the surface of the suspension, heavier constituents sinking down. Prior to contacting the mineral raw material with the heavy pulp in a separator, which may take the form of a fixed cone, of a cyclone or of a rotating drum, it is necessary for the said raw material to be subjected to preparatory treatment comprising crushing it to particles of desirable size, screening the particles and scrubbing them with water. Following separation, the float and sink materials are scrubbed again with water so as to recover the heavy medium which adheres thereto. In a separate operation, the heavy medium is magnetically separated from the pulp diluted with scrubbing water, recovered and decontaminated. The above steps are effected in the sequential order described, practically regardless of the kind of apparatus used.

The preferred heavy media of today are powders which can be recovered by magnetic separation in the manner just described and which can be freed from non-magnetic contaminants. The heavy media primarily comprise magnetite for making pulps with low pulp density, and ferrosilicon containing between 8 and 25 weight % of Si for making pulps with higher pulp densities. The heavy medium, which may be made by an atomization or grinding operation, has a particle size between 0.001 and 0.4 mm.

For a heavy medium it is necessary to combine magnetizability with a series of further properties. The targeted objects are fairly minor consumption of heavy medium, fairly sharp separation of the minerals from each other, and optimum yields of the individual constituents. To ensure good separation, it is primarily necessary for the pulp made with the heavy medium to have the following properties, namely 1. a given pulp density,
2. a given viscosity and consistency, and
3. a given stability, i.e., a given settling rate for solid particles.

Loss of heavy media is caused by

1. Corrosion of the heavy medium,
2. adherence of heavy medium to sink and float materials,
3. removal of magnetically recovered ferrosilicon, through the overflow or effluent outlets of a magnetic separator or thickening apparatus.

The susceptibility to corrosion of the heavy medium in the pulp has been found to critically influence the properties of the heavy pulp and to cause loss of heavy medium.

More particularly, corrosion at increasing rates has been found to result in the formation of superficial oxide layers lowering the concentration and specific density of the heavy medium in the pulp. To maintain the density required for separation, it is necessary to add more heavy medium. As a result, the viscosity of the pulp is increased and the separation or yield of the individual components is rendered more difficult or reduced. As shown in Example 2 and exemplified by products C and E, corrosion of the heavy medium also effects an increased pulp viscosity.

In addition to this, the magnetic properties are affected by the oxide layers originating from corrosion. The corrosion in turn causes the heavy medium particles to be continually reduced in size. The resulting fines of heavy medium cease to settle, because of the increased stability of the pulp and, in the end, they are removed from the thickeners, through overflow outlets. In other words, corrosion phenomena effect higher loss of heavy medium and higher viscosities. This impairs the economy of heavy media separation, the separation efficiency, the yield and concentration of ore in the sink material.

We have now unexpectedly discovered that the susceptibility to corrosion of a ferrosilicon heavy medium can be considerably reduced provided that atomized (pulverized or granulated) or ground ferrosilicon is further alloyed with between 0.3 and 2.5 weight % of phosphorus. This could not be foreseen as phosphorus is normally not employed in metallurgy as one of the elements which are known to improve the resistance to corrosion of alloys and which comprise chromium, nickel and copper, for example.

Iron/silicon/phosphorus-alloys containing between 13 and 25 weight % of silicon and between 2 and 3 weight% of phosphorus have already been described and tested metallographically (cf. F. Sauerwald et al., Zeitschrift fuer anorganische und allgemeine Chemie, volume 210 (1933), pages 23–25). Nothing has, however, been disclosed heretofore relative to their preparation or technical uses, nor to their resistance to corrosion.

The present invention provides more particularly the use of a pulverulent iron/silicon/phosphorus-alloy containing between 8 and 25% by weight of silicon and between 0.3 and 2.5 weight %, preferably between 1 and 1.5 weight % of phosphorus, as heavy medium for making heavy pulps for the heavy media separation of minerals.

Further embodiments of the present invention, which can be used singly or in combination, provide:

a. for the alloy to contain between 0.02 and 2 weight % of carbon;
b. for a major portion of the pulverulent alloy to consist of compact particles having a smooth and spheroidal, preferably a spherical, surface;
c. for the alloy to consist of finely ground powder;
d. for the alloy to be melted from iron, quartz gravel, coal and ferrophosphorus in an electrothermal reduction furnace, or from iron, ferrosilicon and ferrophosphorus in an induction furnace, at temperatures between 1200° and 1650°C, and for the resulting melt to be atomized in conventional manner under pressures between 2 and 30 atmospheres absolute using water, steam or air with the resultant formation of substantially compact particles having a smooth and spheroidal surface;

e. for the alloy to be melted from iron, quartz gravel, coal and ferrophosphorus in an electrothermal reduction furnace, or from iron, ferrosilicon and ferrophosphorus in an induction furnace, at temperatures between 1200° and 1650°C, and for the resulting melt to be cast into moulds, chilled, crushed and ground.

The invention also provides a process for making a heavy pulp for the heavy media separation of minerals, for example ores, which comprises making the heavy pulp from a heavy medium consisting of a pulverulent iron/silicon/phosphorus-alloy containing between 8 and 15 weight % of silicon and between 0.3 and 2.5 weight %, preferably between 1 and 1.5 weight %, of phosphorus.

Heretofore, it has been necessary for phosphorus free ferrosilicon alloys containing between 8 and 25 weight % of silicon to be produced in costly manner in an induction furnace so as to ensure a minor concentration of carbon, e.g., 0.3 weight %, therein. This in view of the fact that the resistance to corrosion of these alloys is known to decrease as the carbon content increases. With this in mind, it is all the more an important and unexpected result that the present invention enables use to be made of an iron/silicon/phosphorus alloy containing up to 2 weight % of carbon, which could not be found to affect the resistance to corrosion of the alloy, in aqueous media. This means in other words that it is possible for the iron/silicon/phosphorus alloy to be produced much more economically, in known manner, in an electrothermal reduction furnace which yields alloys having between 1 and 2 weight % of carbon therein.

In addition to carbon, the iron/silicon/phosphorus-alloys may contain customary commercial contaminants including manganese, aluminum, titanium, chromium, molybdenum, vanadium or sulfur, in proportions of altogether 3 weight %.

In accordance with the present invention use should preferably be made of those pulverulent iron/silicon/phosphorus-alloys, which are produced directly from the melt and atomized with the use of water, steam or air, or granulated in known manner with the use of granulating tablets, grooves or cones. The resulting fused particles are chilled in water, subjected to preliminary dehydration, dried and sieved. The powder particles so produced, which have a smooth surface and spheroidal, spherical or elongated shapes, can be made into pulps that combine high density with low viscosity. In addition to this, the particles practically do not adhere to the ore which is to be separated, and loss of heavy medium is avoided. Still further, the particles are magnetic, highly resistant to corrosion and to abrasion. As a result, it is possible for the heavy medium particles to be recovered from the pulp and to be used repeatedly.

In accordance with the present invention, it is also possible for the heavy medium consisting of expensive atomized or granulated iron/silicon/phosphorus-alloys to be replaced by less costly alloy grades, namely by those which are produced by casting a melt into moulds and grinding the solidified melt. The resulting ground particles may be further passed in known manner, if desired under pressure and with the use of an atomization inducing agent, through a flame zone, wherein they are fused superficially and given a spheroidal shape. As compared with ground phosphorus-free ferrosilicon containing substantially 15 weight % of Si, the ground iron/silicon/phosphorus-alloy has a considerably improved resistance to corrosion.

The pulverulent iron/silicon/phosphorus alloys, which are to be used in accordance with this invention, have densities between 6.3 and 7.2 g/cc, determined pycnometrically, and enable pulps with a density between 2.0 and 3.9, for example, to be made for use in the heavy media separation of ores. This is very advantageous for the separation of iron ores, tungsten ores, diamond ores or calcium fluoride. The pulverulent heavy medium consists of particles with a size substantially between 0.001 and 0.4 mm, the particle size distribution being very regular. As a result, it is possible for the screen analysis curves to be plotted, practically as a straight line, in the Rosin-Rammler diagram. The iron/silicon/phosphorus-alloys of the present invention substantially have the same viscosity, magnetism and resistance to abrasion as known phosphorus-free alloys, and they combine this with a resistance to corrosion, which is a multiple of that of the known alloys.

In the following Examples, the susceptibility to corrosion of heavy media was determined in 300 cc of an aqueous acid acetate buffer solution at 80°C at a pH of 4.62. The heavy medium suspensions, which had a density of 3.5 kg/liter, were stirred for 96 hours using a sheet iron stirrer (400 rpm). The quantity of gas evolved, which substantially was hydrogen, was collected and identified. The drop in the pycnometer density of the heavy medium was also determined, following the end of each test. High quantities of gas and correspondingly higher differences between the densities indicated high susceptibility to corrosion of the heavy medium. The viscosity was determined for a suspension density of 3.0 g/cc at 20°C, in a Stormer rotary viscosimeter.

EXAMPLE 1

850 kg of iron turnings (shovel grade), 400 kg of quartz gravel (diameter: 5 – 45 mm), 200 kg of lean nut coal (diameter: 60 – 100 mm) and 80 kg of ferrophosphorus (fist size), which contained 20 % of phosphorus, were melted in an electrothermal reduction furnace and the resulting melt, which had a temperature of 1500°C, was delivered to an atomization means. The melt was atomized through an annular slit nozzle with steam under a pressure of 11 atmospheres (gauge). The resulting powder was collected in water. Following dehydration and drying, a coarse particle fraction (referred to as product "B" hereinafter) was sieved out and subjected to a corrosion test. The material properties of this fraction and the corrosion test results are indicated under column B below. A comparative test was made with product A. This was atomized ferrosilicon which was free from phosphorus and which was substantially as coarse as product B.

| Product: | A | B |
|---|---|---|
| Pycnometer density (g/cc): | 6.88 | 6.90 |
| Pycnometer density following corrosion | | |

-continued

| Product: | A | B |
|---|---|---|
| test (g/cc): | 6.01 | 6.80 |
| cc of hydrogen gas evolved after 96 h corrosion test (reduced to standard conditions) | 21,390 | 620 |
| Si (weight %) | 14.1 | 14.9 |
| P (weight %) | 0.05 | 1.80 |
| C (weight %) | 1.4 | 1.36 |
| Particle size distribution in starting material in weight % | | |
| >0.200 mm | 2.5 | 2.4 |
| >0.160 mm | 10.2 | 11.0 |
| >0.100 mm | 23.4 | 26.7 |
| >0.063 mm | 44.2 | 48.2 |
| <0.063 mm | 55.8 | 51.8 |

EXAMPLE 2

800 kg of iron scrap, 200 kg of ferrosilicon, which contained 75 weight % of Si, and 80 kg of ferrophosphorus, which contained 20 % of phosphorus, were melted in an induction furnace (mains frequency crucible furnace). The resulting melt was atomized under conditions the same as those reported in Example 1. Following dehydration and drying, an especially fine particulate fraction was isolated and subjected to corrosion tests "E" and "F". Comparative tests "C" and "D" were made with the use of ferrosilicon free from phosphorus, which was atomized or subjected to an additional grinding step and which was substantially as fine as the products tested in tests E and F.

During the heavy media separation of minerals, it is necessary continuously to repump the heavy medium. This causes friction between the heavy medium, the pump and conduits. As a result, the heavy medium is subjected to wear. This effects the formation of active centers on the surface, where corrosion predominantly occurs. The wear effect was demonstrated by 10 hour treatment in a ball mill. The susceptibility to corrosion of ferrosilicon which contained phosphorus was found to have been reduced, following grinding.

| Product: | C | D | E | F |
|---|---|---|---|---|
| Pycnometer density (g/cc) | 7.07 | 7.10 | 7.04 | 7.06 |
| Pycnometer density following corrosion test (g/cc) | 6.91 | 6.58 | 6.99 | 6.90 |
| cc of hydrogen gas evolved after 96 h corrosion test | 3300 | 14100 | 440 | 2800 |
| (reduced to standard conditions) | | | | |
| Si (weight %) | 14.9 | 14.9 | 14.1 | 14.1 |
| P (weight %) | 0.05 | 0.05 | 1.10 | 1.10 |
| C (weight %) | 0.25 | 0.25 | 0.2 | 0.2 |
| Grinding time: | none | 10 hrs | none | 10 hours |

-continued

| Product: | C | D | E | F |
|---|---|---|---|---|
| Vibration density (g/cc) | 4.39 | 4.76 | 4.40 | 4.56 |
| Particle size distribution in % | | | | |
| >0.100 mm | 1.2 | 0.8 | 1.3 | 0.8 |
| >0.063 mm | 9.5 | 9.1 | 10.6 | 9.6 |
| >0.040 mm | 25.5 | 24.4 | 25.8 | 24.6 |
| <0.040 mm | 74.5 | 75.6 | 74.2 | 75.4 |
| Viscosity in cp | | | | |
| prior to corrosion | 24.8 | — | 25.0 | — |
| after corrosion | 39.0 | — | 25.4 | — |

EXAMPLE 3

Ground ferrosilicon with and without phosphorus

The ferrosilicon melt obtained in Example 1 was not atomized but cast into moulds and cooled. The resulting lumpy ferrosilicon was crushed in a crusher, ground in a hammer mill, sieved and subjected to corrosion test "H." Comparative test "G" was made with ferrosilicon which was free from phosphorus and which was substantially as fine as the product tested in test H.

| Product: | G | H |
|---|---|---|
| Pycnometer density (g/cc) | 6.7 | 7.0 |
| Pycnometer density after corrosion test (g/cc) | 5.4 | 6.3 |
| cc of hydrogen gas evolved after 96 h corrosion test | 140 000 | 40 000 |
| (reduced to standard conditions) | | |
| Si (weight %) | 14.1 | 14.9 |
| P (weight %) | 0.05 | 1.8 |
| C (weight %) | 1.4 | 1.36 |
| Particle size distribution in % | | |
| >0.100 mm | 1.5 | 2.0 |
| >0.063 mm | 17.5 | 17.0 |
| >0.040 mm | 29.0 | 28.0 |
| <0.040 mm | 71.0 | 72.0 |

We claim:

1. Heavy pulp composition consisting essentially of water and a water-suspended metal powder consisting of particles with a size substantially between 0.001 and 0.4 mm for the heavy media separation of minerals, wherein the said metal powder is a pulverulent alloy having a density between 6.3 and 7.2 g/cc and consisting essentially of between 8 and 25 weight % of silicon, between 0.3 and 2.5 weight % of phosphorus and between 0.02 and 2 weight % of carbon, the balance being substantially iron, and the pulp density ranging between 2.0 and 3.9 g/cc.

2. The heavy pulp of claim 1, wherein the alloy contains between 1 and 1.5 weight % of phosphorus.

3. The heavy pulp of claim 1, wherein a major portion of the alloy consists of compact particles having a smooth and spheroidal surface.

4. The heavy pulp of claim 1, wherein the alloy is a finely ground powder.

5. The heavy pulp of claim 3, wherein the alloy is an alloy produced by the steps comprising melting iron, quartz gravel, coal and ferrophosphorus in an electrothermal reduction furnace, or melting iron, ferrosilicon and ferrophosphorus in an induction furnace, at temperatures between 1200° and 1650°C, atomizing the resulting melt in known manner under pressures between 2 and 30 atmospheres absolute using water, steam or air with the resultant formation of substantially compact particles having a smooth and spheroidal surface.

6. The heavy pulp of claim 4, wherein the alloy is an alloy produced by the steps comprising melting iron, quartz gravel, coal and ferrophosphorus in an electrothermal reduction furnace, or melting iron, ferrosilicon and ferrophosphorus, in an induction furnace, at temperatures between 1200° and 1650°C, casting the resulting melt into moulds, chilling the melt, crushing the solidified melt and grinding it.

* * * * *